(12) United States Patent
Unakafov et al.

(10) Patent No.: US 12,222,831 B2
(45) Date of Patent: Feb. 11, 2025

(54) METHOD, COMPUTER PROGRAM PRODUCT, TEST SIGNAL AND TEST DEVICE FOR TESTING A DATA-TRANSFERRING ARRANGEMENT INCLUDING A TRANSMITTER, CHANNEL AND RECEIVER

(71) Applicant: BitifEye Digital Test Solutions GmbH, Boeblingen (DE)

(72) Inventors: Anton Unakafov, Stuttgart (DE); Wolfgang Koebele, Nagold (DE); Valentina Unakafova, Stuttgart (DE); Victor-Rico Sanchez-Guerra, Holzgerlingen (DE); Ransom Stephens, Ashland, OR (US); Hermann Stehling, Herrenberg-Kayh (DE)

(73) Assignee: BitifEye Digital Test Solutions GmbH, Boeblingen (DE)

( * ) Notice: Subject to any disclaimer, the term of this patent is extended or adjusted under 35 U.S.C. 154(b) by 53 days.

(21) Appl. No.: 18/112,289

(22) Filed: Feb. 21, 2023

(65) Prior Publication Data

US 2023/0267056 A1   Aug. 24, 2023

Related U.S. Application Data

(60) Provisional application No. 63/312,149, filed on Feb. 21, 2022.

(30) Foreign Application Priority Data

Feb. 21, 2022   (DE) .................... 10 2022 104 032.1

(51) Int. Cl.
  *G06F 11/00*  (2006.01)
  *G06F 11/263*  (2006.01)
  *G06F 11/277*  (2006.01)
(52) U.S. Cl.
  CPC .......... *G06F 11/263* (2013.01); *G06F 11/277* (2013.01)

(58) Field of Classification Search
  CPC .. G06F 11/263; G06F 11/277; G06F 11/2263; G06F 11/221
  See application file for complete search history.

(56) References Cited

U.S. PATENT DOCUMENTS

| 6,744,496 | B2 | 6/2004 | Audouin et al. | |
| 2022/0058097 | A1* | 2/2022 | Bautista | ............. G01R 31/3181 |
| 2023/0267056 | A1* | 8/2023 | Unakafov | ............. G06F 11/277 714/33 |

FOREIGN PATENT DOCUMENTS

| DE | 60208312 T2 | 9/2006 |
| DE | 102018202461 A1 | 8/2019 |
| DE | 102009007296 B4 | 3/2022 |

OTHER PUBLICATIONS

Office Action issued in German Patent Application No. DE 10 2022 104 032.1, dated Sep. 27, 2022 (from which this application claims priority) and English machine translation thereof.

* cited by examiner

*Primary Examiner* — Philip Guyton
(74) *Attorney, Agent, or Firm* — Ewers IP Law PLLC; Falk Ewers

(57) ABSTRACT

A method for testing a data-transferring arrangement includes (c) acquiring a channel output-side data set, (d)(e) evaluating the channel output-side data set to determine an error distribution and a bit error ratio in the channel output-side data set, (f) determining at least one test subsequence, (g) forming a further test data set with at least the determined test subsequence, (h) applying the further test data set to the data-transferring arrangement, (i) acquiring a present channel output-side data set based on the further test data set, (j)(k) evaluating the present channel output-side data set to determine a present error distribution and to determine a present bit error ratio in the present channel output-side data set, comparing the present bit error ratio with a predetermined threshold value and, if the comparison reveals that the bit error ratio is larger than the predetermined threshold value, repeatedly carrying out steps (f) to (k).

14 Claims, 7 Drawing Sheets

METHOD, COMPUTER PROGRAM PRODUCT, TEST SIGNAL AND TEST DEVICE FOR TESTING A DATA-TRANSFERRING ARRANGEMENT INCLUDING A TRANSMITTER, CHANNEL AND RECEIVER

CROSS REFERENCE TO RELATED APPLICATIONS

This application claims priority to U.S. provisional application 63/312,149, filed Feb. 21, 2022, and German patent application 10 2022 104 032.1, filed Feb. 21, 2022, the entire content of both applications is incorporated herein by reference.

TECHNICAL FIELD

The disclosure relates to a method, a computer program product, a test signal, and a test device for testing a data-transferring arrangement comprising a transmitter, channel and receiver.

BACKGROUND

In information theory, a channel (also called information channel, transfer channel, transfer path) is understood as a concept for modeling the loss of information as a result of disturbances during the transfer. In this case, the channel is not just restricted to the medium via which the transfer takes place, but rather describes the entire transfer path from the transmitter to the receiver. Data transmitters and data receivers and possibly interposed components can also cause disturbances.

At the present time data receivers are tested with so-called conformity tests with a previously defined test signal. The test signal has a defined test pattern and introduced "impairments", i.e., deviations from the ideal signal that are introduced in as targeted and accurate a manner as possible, such as noise, jitter, etc. The type, the intensity and the "mix" of the added impairments are stipulated by the respective specifications, e.g., PCI Express.

Such "compliant impairments" are defined by the respective data communication standard, wherein the specific parameters and their values can vary. Examples of impairments are: random noise: (pseudo-) random values are added to the signal, periodic noise, random jitter: the level transitions take place somewhat earlier or somewhat later than they should, the deviations being random, deterministic (in particular periodic) jitter: the level transitions take place somewhat earlier or somewhat later than they should, the deviations being defined by a periodic law or some other algorithm, crosstalk (deterministic); and intersymbol interference on account of the channel loss (deterministic, cf. also https://teledynelecroy.com/doc/understanding-dj-ddj-pj-jitter- calculations).

The impairments emulate real distortions that influence a signal in the real work environment. In other words, the test signal can be regarded as a payload signal that is combined with a disturbance signal in the form of the impairments in order to simulate a real payload signal distorted by disturbance signals.

In modern data communication standards, these distortions are very great on account of the high data rates and no data receiver can receive signals without errors. The specifications therefore allow the data receiver to have "read errors" relatively frequently. This is defined by the number of incorrectly interpreted bits being expressed as a maximum permissible proportion of the total number of received bits, the bit error ratio (BER), if the signal contains digital data, e.g. in the form of bit sequences.

In order to correct these errors, so-called "Forward Error Correction" (FEC) is used. This is a specific encoding of data, e.g., in the form of data sets. A further technique used to reduce distortions of signals is scrambling. Therefore, the data arriving at the data receiver are normally scrambled and FEC-pre-coded.

Since FEC is not part of the physical layer, the performance of the physical layer is characterized by a pre-FEC BER. When testing the physical layer, pseudo-random data sequences (PRBS) are typically used as test signal. The PRBS are suitable for testing purposes since they load the data receiver to a larger extent on average than real test signals of the same length. In contrast to normal test signals, these data sequences are not scrambled and are not FEC-coded, and so a post-FEC BER cannot be determined for them.

The conformity test is necessary in order to enable a minimum verification of the data receivers, but this does not allow problems of the design to be identified and checked for the device under test (DUT) in the worst case (i.e., worst possible signals or greatest impairments). The main reason for this is that the PRBS does not completely represent all possible data sets which can be transmitted during real operation. Although the PRBS load the receiver to a larger extent on average than real data of the same length, there may be real data sets which load the receiver to a larger extent.

SUMMARY

It is therefore an object of the disclosure to provide ways to extend and/or supplement such conformity tests in order to be able more easily to determine critical elements, e.g., in a design of a data receiver.

The object of the disclosure is achieved with a method for testing a data-transferring arrangement, including the following steps: generating an initial test data set with a predetermined minimum number of repetitions, applying the initial test data set to the data-transferring arrangement, acquiring a channel output-side data set on the basis of the initial test data set, evaluating the channel output-side data set in order to determine an error distribution in the channel output-side data set, evaluating the channel output-side data set in order to determine a bit error ratio in the channel output-side data set, determining at least one test subsequence by evaluating the error distribution, forming a further test data set with at least the determined test subsequence, applying the further test data set to the data-transferring arrangement, acquiring a present channel output-side data set on the basis of the further test data set, evaluating the present channel output-side data set in order to determine a present error distribution in the present channel output-side data set, evaluating the present channel output-side output data set in order to determine a present bit error ratio in the present channel output-side data set, comparing the present bit error ratio with a predetermined threshold value and, if the comparison reveals that the bit error ratio is larger than the predetermined threshold value, carrying out, in particular repeatedly carrying out, the steps starting from the step of determining at least one error-causing test subsequence by evaluating the error distribution, and evaluating the present channel output-side data set for error analysis if the comparison reveals that the present bit error ratio is less than the predetermined threshold value.

In other words, a two-stage procedure is provided, in which the results obtained by using an initial test data set are examined in order to find particularly error-prone subsequences of the test data set, which are then used to form a particularly demanding or critical further, second test data set. This test data set allows improved, more critical tests. Furthermore, the compression to or summarization of particularly error-prone subsequences enables the time needed for such tests to be reduced.

A test subsequence can cause e.g., at least one single error. There is thus a unique assignment of test subsequence and respective error. Deviant therefrom, a test subsequence can also cause a plurality of errors. To that end, in an iterative process, further test subsequences are ascertained and added to the test data set in order to optimize the test data set ever further in a stepwise manner, in the sense that the test pattern has the signal sequence which is the most complex (which loads the receiver to the greatest extent) but which is compliant, i.e. possible during real operation.

In accordance with one exemplary embodiment, channel parameters of the data-transferring arrangement are determined in a further step. The channel parameters determined can be a single bit response (SBR(t)), a delay and/or a length of the signal, which are transferred via a channel of the data-transferring arrangement.

In accordance with a further exemplary embodiment, the step determining at least one error-causing test subsequence by evaluating the error distribution has at least the following steps: checking whether the determined bit error ratio is less than a predetermined limit value, and performing the further steps if the determined bit error ratio is less than a predetermined limit value: determining at least one further test subsequence on the basis of the determined test subsequence, and adding the further test subsequence to the further test data set.

If, therefore, the channel output-side test data set generates too few errors for a meaningful evaluation, i.e., the bit error ratio is too low, further test subsequences are determined on the basis of a previously determined test subsequence, e.g., by altering the previously determined test subsequence. In other words, "artificial" test subsequences are generated, which are similar to the previously determined test subsequence and should therefore also lead to errors. These test subsequences are then added to the test data set, with the result that the test data set has an increased number of test subsequences.

In accordance with a further exemplary embodiment, the step determining at least one further test subsequence on the basis of the determined test subsequence includes determining an inverse of an error-causing test subsequence as further test subsequence.

To that end, e.g., in the case of a four-valued signal, such as a PAM-4 signal, a complementary four-valued signal is generated. If, e.g., the four-valued signal can assume the values 0, 1, 2 and 3, the inverse, e.g., of the signal sequence 13032 is the signal sequence 20301. In this case, a respective inverse can be determined from a single test subsequence or else for all of the test subsequences.

In accordance with a further exemplary embodiment, the step determining at least one further test subsequence on the basis of the determined test subsequence comprises forming a group of test subsequences with an identical symbol at a predetermined point of a pulse response.

In other words, only those test subsequences are selected in which at least one symbol at a predetermined point is identical. The predetermined point can be the maximum of the pulse response.

In accordance with a further exemplary embodiment, the step determining at least one further test subsequence on the basis of the determined test subsequences comprises determining and evaluating a predetermined similarity criterion with regard to test subsequences in order to select test subsequences.

Typical test subsequences can thus be determined particularly simply.

Furthermore, the disclosure includes a computer program product, configured for performing such a method, a test data set, determined according to such a method, and a test device.

BRIEF DESCRIPTION OF THE DRAWINGS

The disclosure will now be described with reference to the drawings wherein.

DESCRIPTION OF EXEMPLARY EMBODIMENTS

Figure 1:
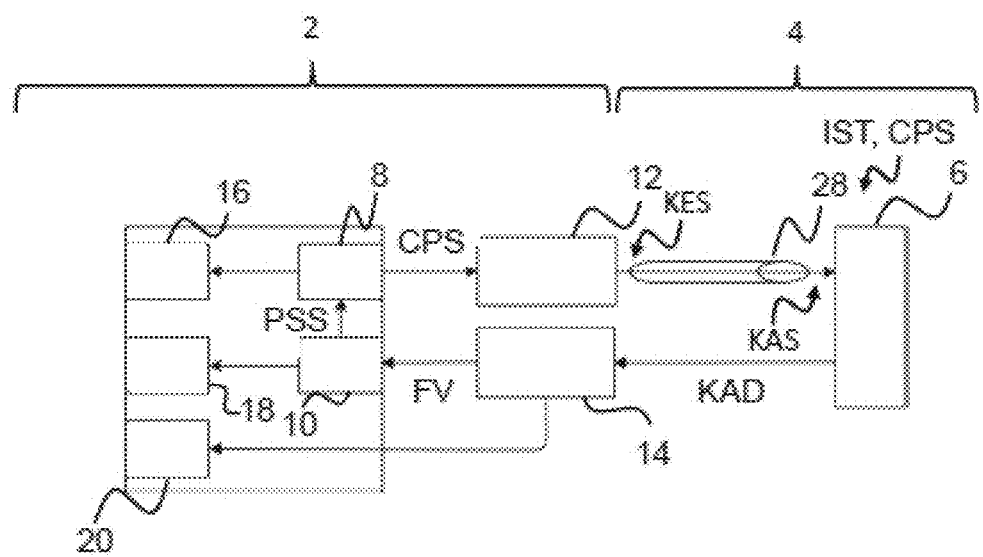
FIG. 1 shows an overview of a test device according to the disclosure.

Firstly, reference is made to FIG. 1. The illustration shows a test device 2 for testing a data-transferring arrangement 4 with at least one data-transferring channel 28 and with a device under test 6 (DUT).

In the present exemplary embodiment, for example, the test device 2 can be configured such that it is IBIS-compliant (Buffer Information Specification) or AMI-compliant (Algorithmic Modeling Interface).

In the present exemplary embodiment, the channel 28 is configured as a wired channel. Deviant from the present exemplary embodiment, the channel 4 can also be configured in wireless fashion, i.e., as a radio link, for example.

The channel 28 can be regarded as a serial high-speed interface with a high permissible bit error ratio (>10−6). Such serial high-speed interfaces are operated with multi-gigabit data rates (5 Gbit/s or more). Modern serial high-speed interfaces allow a relatively high bit error ratio on account of the great distortions experienced by the signal at high data rates, and in particular on account of the low signal-to-noise ratio that is typical of modern interfaces that use amplitude modulation with more than 2 levels. These modulations are referred to as PAM-N, where N is the number of levels.

Earlier versions of communication standards often aimed to attain very infrequent errors, e.g., a bit error ratio BER<$10^{-12}$. That means that one error occurs per $10^{12}$ received bits. A genuine check of the bit error ratio BER was therefore virtually impossible: at data transfer rates of ~1 GBit/s, a bit error ratio of $10^{12}$ would mean that an error occurs on average once per 1000 s. A statistically reliable measurement of the actual BER would therefore require tests lasting for hours.

According to the abovementioned standards for the new high-speed interfaces, the permissible bit error ratio is much higher (BER~$10^{-6}$). This enables an actual bit error ratio measurement, as a result of which the provided disclosure becomes feasible.

In the present exemplary embodiment, a PAM-4 signal with four possible states or symbols (0, 1, 2 and 3) can be transferred via the channel 28. Deviant from the present exemplary embodiment, data sets with other encoding schemes, such as, e.g., PAM-2, PAM-3, PAM-8, PAM-16, ENRZ or else CNRZ-5, can also be transferred via the channel 28.

Furthermore, in the present exemplary embodiment, amplitude-modulated signals are transferred via the channel 28.

The channel 28 in accordance with the PCI Express 6 standard can include a plurality of lines, typically 8, 16 or 32. These lines are routed and operated in parallel, but each individual line per se is a serial data line. This architecture is also referred to as "multiple serial". In the present exemplary embodiment, each of the lines is tested separately one after another. Deviant from the present exemplary embodiment, the test device 2 can be configured for multi-lane tests (for a plurality of lines simultaneously).

Other data communication standards may be IEEE802.3bs/cd (50GAUI C2M/C2C, KR-n, CR-n), IEEE802.3ck (100GAUI C2M/C2C, KR-n, CR-n), OIF CEI-56G, OIF CEI-112G or other PAM-N standards.

Furthermore, in the present exemplary embodiment, the channel 28 is configured for differential signal transfer.

Differential signal transfer can be used in the present exemplary embodiment. In the context of differential signal transfer, in order to reduce noise, a signal S (t) is transferred in the form of two physical subsignals, namely s+(t)=S(t)/2 and s−(t)=−S(t)/2. These two subsignals s+(t) and s−(t) are transferred on separate lines of the channel 4 and arrive at the receiver synchronously, such that the original signal can be calculated as follows:

$$S(t)=s+(t)-s-(t)$$

Deviant from the present exemplary embodiment, other signaling schemes such as, e.g., Chord signaling can also be used.

In the present exemplary embodiment, the test device 2 includes as components a CPS generator 8, a PSS detector 10, a signal generator 12, an error detector 14, a CPS eye visualizer 16, a PSS classifier 18 and a post-FEC determining unit 20, while, in the present exemplary embodiment, the data-transferring arrangement 4 includes the data-transferring channel 4 with the device under test 6.

The signal generator 12 can be regarded as the transmitter of the data-transferring arrangement 4, while the device under test 6 can be regarded as the receiver of the data-transferring arrangement 4.

Since, in the present exemplary embodiment, the signal generator 12 is assigned to the test device 2, the channel 28 and the device under test 6 are tested in the present exemplary embodiment. Deviant from the present exemplary embodiment, the test device 2 can also be assigned the channel 28 or additionally the signal generator 12. In that case, either only the device under test 6 or the total combination, consisting of signal generator 12 (transmitter), channel 18 and device under test 6 (receiver), are tested.

The test device 2 and its components mentioned can include hardware and/or software components correspondingly configured in each case for its tasks and/or functions described below.

For the purpose of testing the data-transferring channel 28, e.g., the signal generator 12 of the test device 2 is configured to generate an initial test data set IST with a predetermined minimum number of repetitions and to apply the initial test data set IST to the channel 4. In the present exemplary embodiment, the signal generator 12 has a sampling rate of at least 64 Gsamples/s and a vertical resolution of at least 8 bits.

The test device 2 is configured to acquire a channel output-side data set KAD on the basis of the initial test data set IST and to evaluate said channel output-side data set in order to determine an error distribution FV in the channel output-side signal KAS.

For this purpose, in the present exemplary embodiment, the device under test 6 is configured to determine the channel output-side data set KAD from a channel output-side signal KAS, to encode the channel output-side signal KAS again and to forward it to the error detector 14.

In other words, in the present exemplary embodiment, the function generator 12 as transmitter provides a channel input-side signal KES on the basis of the initial test data set IST, which channel input-side signal is transferred via the channel 28 and received in the form of a channel output-side signal KAS by the device under test 6 as receiver and is converted again into a channel output-side data set KAD.

In this case, a data set combines the information/values related to an object (entity) and has a defined beginning and a defined end, in contrast to a data stream without a defined beginning and end. Similar terms are: tuple, group, data record, record set. A signal, by contrast, is a symbol with a meaning allocated to it.

The initial test data set IST can consist of a conformity test pattern (="fixed pattern", e.g., PRBS31Q or SSPRQ) and introduced "Impairments" (e.g. noise, jitter, etc.). At transfer rates of larger than 20 gigasymbols/second such as are typical of modern interfaces, the transmission of the initial test signal IST takes less than ($2*10^{12}/20*10^{9}$)=100 seconds, i.e., less than 2 minutes, which makes it practicable to experimentally acquire error statistics for the entire pattern.

In this case, the error distribution FV indicates at what points of the channel output-side signal KAS errors have occurred, e.g., by comparison with the initial test data set IST.

The PSS detector 10 evaluates the error distribution FV in order to determine test subsequences PSS (problematic subsequences).

Here data received by the receiver—the channel output-side data KAD—are compared with the originally transmitted data from the initial test data set IST—and it is established, for example, that they differ by 4 symbols (there are 4 errors). For the sake of simplicity, it is assumed that the errors are concentrated in a part of the signal, even though normally they are distributed over the entire signal:

The original data in the initial test data set IST read:
. . . 10000232102012030200000202101000031021031023012333323 . . .

The received-channel output-side data set KAD read:
. . . 10100232102012030200000202101010031121031023012323023 . . .

The 4 errors occur in the following subsequences (assuming length N=5, delay m=2):
10000 (received as 10100)—this error occurs twice here,
31021 (received as 31121), and
23333 (received as 23233).

Consequently, from $4^5$=1024 subsequences with the length N=5, only three subsequences cause respective errors; the subsequence 10000 even causes errors twice. All three subsequences are classified as PSS, one of them (10000) with higher probability than the others.

In the present exemplary embodiment, the test subsequence PSS contains a section of the initial test signal IST which contains errors in accordance with the error distribution FV.

The CPS generator 8 is configured to determine a further test data set CPS (compliant problematic sequence) with at least the determined test subsequences PSS and to apply to the channel 28 the further test signal on the basis of the test data set CPS.

For this purpose, the CPS generator 8 can include artificial intelligence (AI) components in the form of, e.g., evolutionary algorithms: a plurality of CPS generating rules evolve automatically and are constantly compared with one another in regard to a post-FEC error and/or the frequency of PSS per CPS. The sub-optimum rules are discarded, while the best rules survive and undergo further mutations until optimum generating rules have been found. Alternatively, a strategy for maximizing rewards obtained can be learned independently with reinforcement learning. The number of PSS or the post-FEC BER is used here as "reward".

Neither method requires training data and both methods learn by themselves in the course of solving the problem.

In addition, methods of unsupervised learning can also be used. Furthermore, the CPS generator 8 can also be configured such that it is free of AI components.

Furthermore, the post-FEC determining unit 20 of the test device 2 is configured to evaluate the channel output-side data set KAD in order to determine a bit error ratio BER.

Consequently, in the present exemplary embodiment, the test device 2 is configured to determine at least one test subsequence PSS by evaluating the error distribution FV and to determine a further test data set CPS with at least the determined test subsequence PSS.

Furthermore, in the present exemplary embodiment, the test device 2 is configured to apply to the channel 28 the further test signal on the basis of the test data set CPS and to acquire a present channel output-side data set KAD on the basis of the further test data set CPS.

Furthermore, in the present exemplary embodiment, the test device 2 is configured to evaluate the present channel output-side data set KAD in order to determine a present error distribution FV in the channel output-side data set KAD and in order to determine a present bit error ratio BER in the present channel output-side data set KAD.

Furthermore, in the present exemplary embodiment, the test device 2 is configured to compare the present bit error ratio BER with a predetermined threshold value SW. If the comparison reveals that the bit error ratio BER is larger than the predetermined threshold value SW, at least one further test subsequence PSS is determined by evaluating the error distribution FV.

If the determined bit error ratio BER is larger than the predetermined threshold value SW, in the present exemplary embodiment, the test device 2 is configured to determine at least one further test subsequence PSS by evaluating the error distribution FV, to determine a further test signal CPS with at least the determined test subsequence PSS, to apply to the channel 4 the further test signal on the basis of the test data set CPS, to determine a present channel output-side data set KAD on the basis of the further test data set CPS, to evaluate the present channel output-side data set KAD in order to determine a present error distribution FV in the channel output-side data set KAD, and to evaluate the present channel output-side data set KAD once again in order to determine a present bit error ratio BER in the present channel output-side data set KAD.

Furthermore, in the present exemplary embodiment, the test device 2 is configured to evaluate the channel output-side data set KAD for error analysis if the comparison reveals that the present bit error ratio BER is less than the predetermined threshold value SW.

In an iterative manner, the test device 2 with its components mentioned is configured then to ascertain further test subsequences PSS and to add them to the further test data set CPS in order thus to optimize the test data set ever further in a stepwise manner. In other words, the bit error ratio BER rises in the course of each iterative pass. A termination can take place if, e.g., the bit error ratio BER rises by less than a threshold value SW in the course of each of the three successive passes. The threshold value SW can be, e.g., 0.1%, 0.05% or user-defined.

Furthermore, in the present exemplary embodiment, the test device 2 is configured to check whether the bit error ratio BER determined by evaluating the channel output-side data set KAD is less than a predetermined limit value GW. If the bit error ratio BER is less than the limit value GW, a process of determining at least one further test subsequence PSS on the basis of the determined test subsequence PSS is effected and the further test subsequence PSS is added to the further test signal CPS.

In this case, the test device 2 can be configured to determine an inverse of a test subsequence PSS as a further test subsequence PSS and/or to form a group of test subsequences PSS with an identical symbol at a predetermined point of a pulse response, in particular a maximum pulse response, and/or to evaluate a predetermined similarity criterion MET with regard to test subsequences PSS.

Evaluating the channel output-side data set KAD for error analysis can include the following tests: Disturbance tolerance test: the receiver interprets the signal with a bit error ratio BER that is below the maximum value allowed by the standard, even in the case of noise. For this test, a specific amount (defined in the specification) of noise is added to the signal.

The jitter tolerance test is the same, but jitter is added instead of noise.

Some standards prescribe a combination of different impairments rather than single impairments.

Furthermore, post-FEC errors can be determined.

Further evaluation methods will be explained later.

Furthermore, in the present exemplary embodiment, the test device 2 is configured to determine channel parameters SBR(t), N and m of the channel 4 before the iterative passes.

Figure 2:
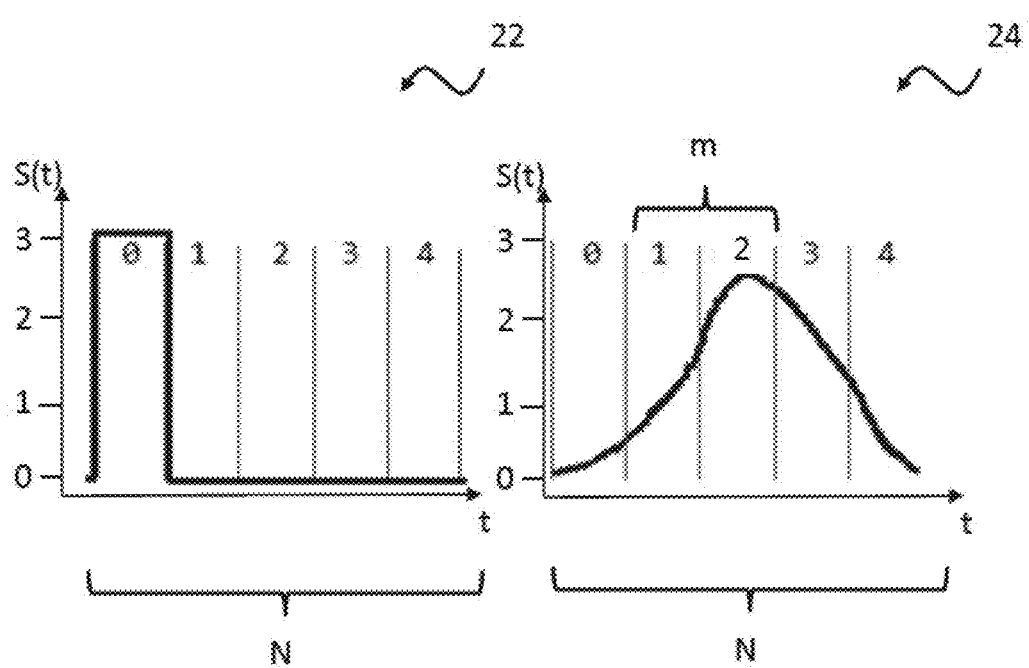
FIG. 2 shows a pulse response in a schematic illustration.

In this respect, reference is now additionally made to FIG. 2.

In the present exemplary embodiment, the channel parameters determined are an SBR single bit response (single bit response SBR(t)), a delay m (Delay) and/or a length N of the signal S(t).

The illustration shows an ideal single pulse 22 and a corresponding pulse response 24, also called single bit response or SBR (single bit response SBR(t)), of a PAM-4 signal S(t) with the possible symbols 0, 1, 2 and 3.

In the case of an ideal channel 4, the ideal single pulse 22 corresponds to the ideal pulse response, i.e., the ideal single pulse affects only the pulse in the 0-th symbol and no other symbol.

In reality, however, the pulse response 24 is much less sharp on account of channel effects, has a delay or a delay m and extends over a plurality of symbols N or has a corresponding length of the signal S(t).

In this example, the number of symbols N or the length of the signal is N=5 and the delay m or a delay is m=2. In other words, a receiver would not "see" the single pulse at the point in time 0 when it took place, but rather only at the point in time 2. Here the signal level approximately corresponds to the maximum value of the ideal single pulse 22.

Furthermore, for evaluation purposes, eye diagrams can be generated and evaluated.

Figure 3:
FIG. 3 shows a first eye diagram in a schematic illustration.
Figure 3:
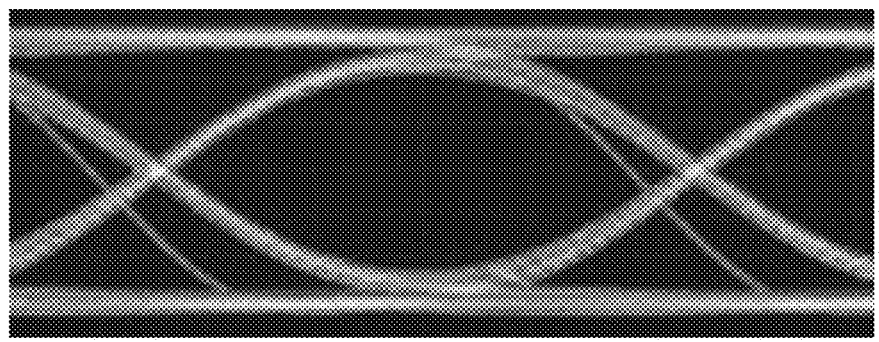
Figure 4:
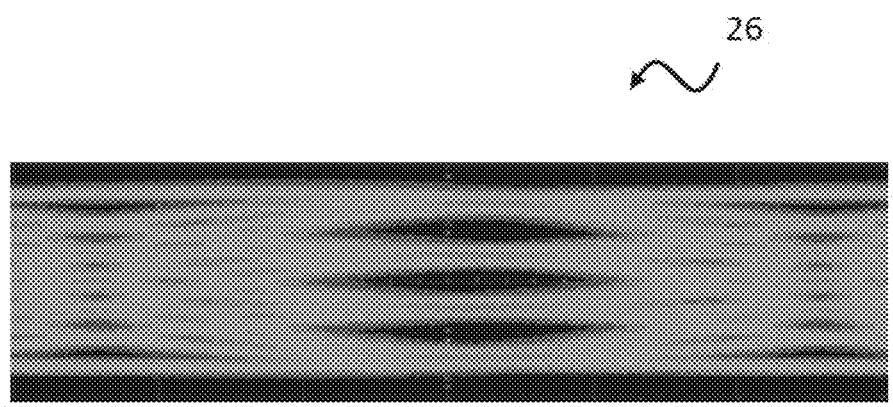
FIG. 4 shows a second eye diagram in a schematic illustration.
Figure 5:
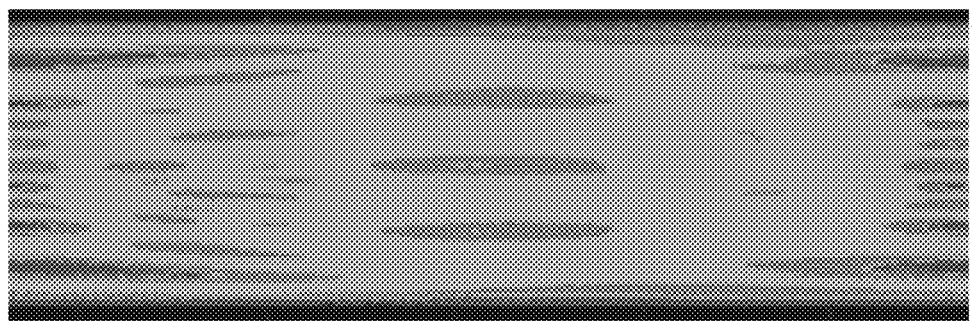
FIG. 5 shows a third eye diagram in a schematic illustration.

In this respect, reference is additionally made to FIGS. 3 to 5.

In this case, FIG. 3 shows a simple eye diagram with one eye 26, FIG. 4 shows a PAM-4 eye diagram with 4 levels and 3 eyes 26, and FIG. 5 shows an eye diagram with closed eyes 26.

An eye diagram is a graphical representation of electrical signal profiles which can be used to assess the signal quality of a digital data transfer. The eye diagram can be replaced by a series of numerical features, but it is also so simple that it can be evaluated by a very simple algorithm, that is to say that the evaluation can be completely automated, and a user is not needed for the evaluation.

An eye diagram is a kind of summation of the possible signal profiles distributed statistically. If appropriate, a color coding is used here, such that the probability of the signal profile becomes clear from the color. As a result of the influences to which the signal is subjected, the theoretically infinitely steep transitions proceed from 0 to 1, and vice versa, here do not proceed in a mathematically rectangular or constant fashion at the same point, but rather as blurred transitions of larger or lesser width, as a result of which the typical shape of an eye arises in the center in the case of "small impairments" (see FIG. 3).

In other words, the eye diagram visualizes the problems of the signal transfers. If there are no or only slight problems, the eye 26 must be wide open and free of signal excursions.

If the transfer disturbances can be predicted because they are causal and deterministic, the signal can still be received with equalization. The accurate knowledge of the subsequences that cause excursions in the eye 26 assists the developers in optimizing their design and in particular in equalization.

If the eye 26 is closed (see FIG. 5), then signal reconstruction with a simple threshold value detector is not possible. Even with the eye 26 open, the identification may be impossible if the levels do not have the necessary magnitude for driving the stage that follows. The horizontal eye opening indicates the temporal range in which an evaluation of the logical instantaneous state is possible. If the phase relationships are not clear or change too much on account of jitter, the eye 26 closes.

Furthermore, an evaluation can be effected on the basis of the following scheme.

The problem is diagnosed by classification of the test subsequences PSS. In order to define the classes to which a test subsequence PSS belongs, a check is made to establish whether the respective test subsequence PSS has one of the following class-defining properties:

1. Complex test subsequences PSS (with different symbols in different combinations, free of repeating signal subcombinations, such as e.g. 230131201132, indicate equalization problems;
2. test subsequence PSS with unbalanced mark density (i.e. the average value of the test subsequence PSS is distinctly below or distinctly above the average value of the signal; e.g. a PAM-4 test subsequence PSS 3232223332 has the average value of 2.5 although the average level of the PAM-4 signal is (0+1+2+3)/4=1.5. This indicates a baseline drift in the receiver or problems in the AC coupling of the receiver frontend; and
3. test subsequence PSS with long sections of successive identical symbols (e.g. 0000001) or of symbols with a small voltage swing (e.g. a PAM-4 signal PSS 1221221112) indicates problems with clock recovery.

The test subsequences PSS may also have a plurality of properties which belong simultaneously to a plurality of classes. For example, the test subsequence PSS with the sequence 100001001 belongs to classes 2 and 3.

Furthermore, in the present exemplary embodiment, the test device 2 is configured to determine an inverse INV (see FIG. 7) of the test subsequence PSS as present further test subsequence PSS if the bit error ratio BER is less than the predetermined limit value.

In the case of a PAM-4 signal 20301, for example, the inverse INV reads 13032.

On account of signal transfer with differential transfer in the present exemplary embodiment, it can be assumed that all effects on the channel 4 are vertically symmetrical.

The conditions for transferring the subsequences s+(t) and s (t) are normally identical; therefore, an increase in s+ (which can cause the receiver to incorrectly interpret 0 as 1) is just as likely as an increase in s− (which can cause the receiver to incorrectly interpret 3 as 2).

Furthermore, in the present exemplary embodiment, the test device 2 is configured to form a group of test subsequences PSS with an identical symbol at a predetermined point of a pulse response, in particular a maximum pulse response. In this case, the identical symbol is understood to mean that symbol in the sequence at which the error actually occurs.

Furthermore, in the present exemplary embodiment, the test device 2 is configured for determining and evaluating a predetermined similarity criterion MET with regard to test subsequences PSS in order to select test subsequences PSS.

One example of a similarity criterion MET is:

$$similarityMetric(s1, s2) = \sum_{i=0}^{N-1}(s1(i) - s2(i))^2 \cdot SBR(i) \tag{1}$$

Two sequences s1, s2 are totally similar if similarityMetric(s1, s2)=0. The larger the value of similarityMetric(s1, s2), the less similar the two sequences s1, s2 are.

For the SBR single bit response (single bit response SBR(t)) of the channel 4 illustrated in FIG. 2, the respective SBR values read e.g.: SBR(0)=0.05; SBR(1)=0.15; SBR(2)= 0.4; SBR (0)=0.3; SBR(4)=0.1.

The similarity criterion MET for the two sequences s1=01300 and s2=10300 is then given by:

similarityMetric(01300,10300)=(0−1)$^2$·0.05+ (1−0)$^2$·0.15+0+0+0=0.2.

This value is close to 0 and the sequences s1, s2 are in fact similar.

By contrast, the similarity criterion MET for the sequences s1=01300 and s2=12211 has the value 1, which means that these sequences s1, s2 are quite different.

Figure 6:
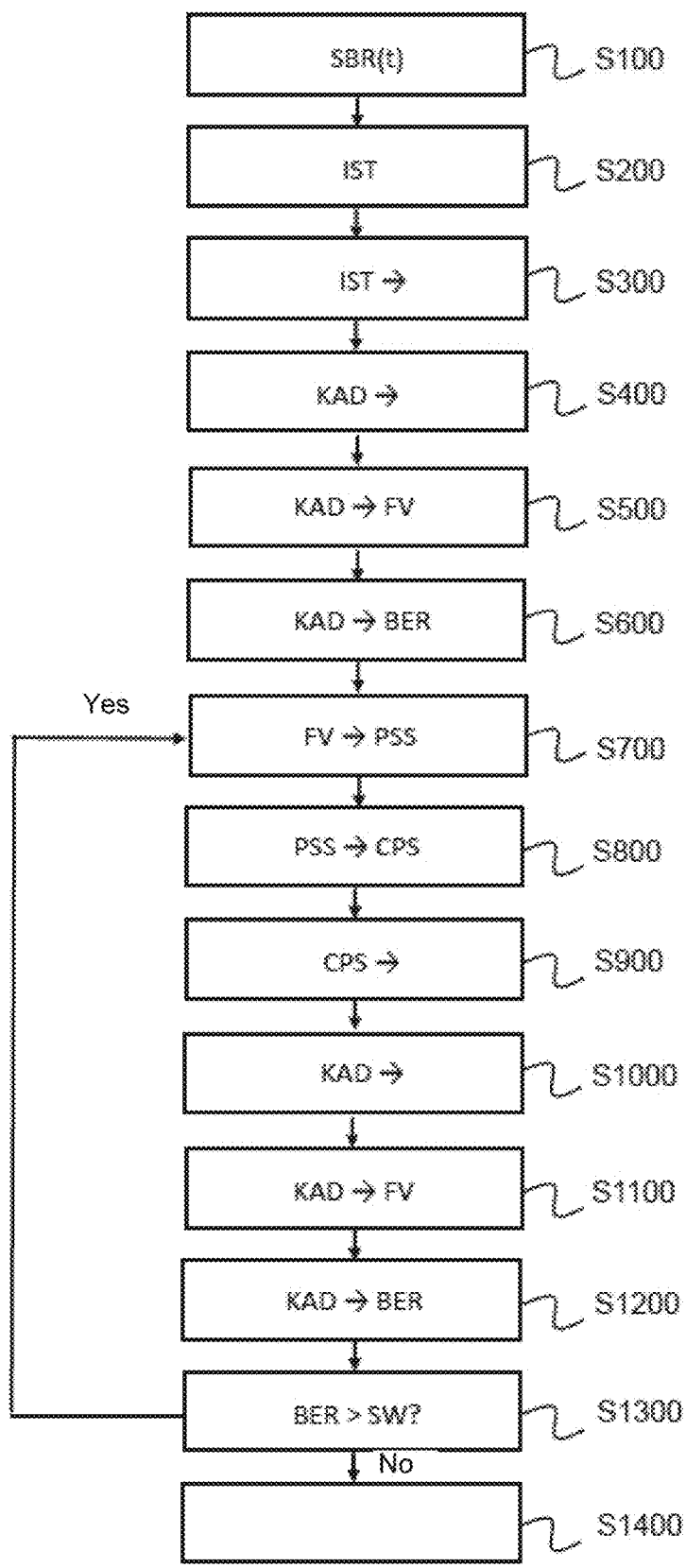
FIG. 6 shows, in a schematic illustration, a method sequence for operating the test device shown in FIG. 1.
Figure 7:
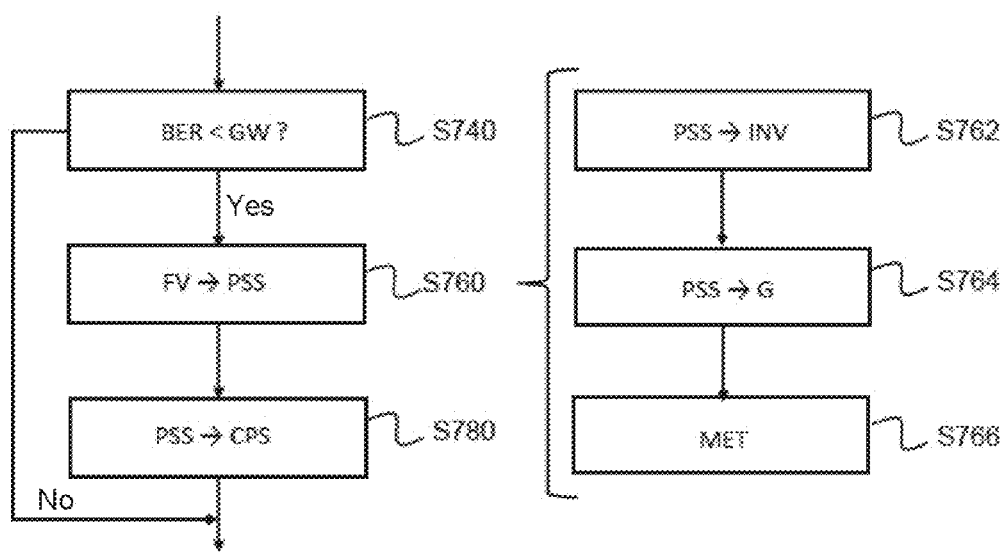
FIG. 7 shows, in a schematic illustration, further details of the method sequence shown in FIG. 1.

A method sequence in particular for operating the test device 2 will now be explained with reference additionally to FIGS. 6 and 7.

A first step S100 involves determining channel parameters (SBR(t), N, m) of the channel 4.

A further step S200 involves generating the initial test data set IST with a predetermined minimum number of repetitions.

A further step S300 involves applying the initial test data set IST to the channel 28.

A further step S400 involves acquiring the channel output-side data set KAD on the basis of the initial test data set IST.

A further step S500 involves evaluating the channel output-side data set KAD in order to determine an error distribution FV in the channel output-side test data set KAS.

A further step S600 involves evaluating the channel output-side data set KAD in order to determine a bit error ratio BER in the channel output-side signal data set KAD.

A further step S700 involves determining the test subsequence PSS by evaluating the error distribution FV.

For this purpose, a further step S740 involves checking whether the bit error ratio BER determined by evaluating the channel output-side data set KAD in step S600 is less than the predetermined limit value GW.

If the bit error ratio BER is not less than the predetermined limit value GW, the method is continued with a further step S800. Deviant from the present exemplary embodiment, provision can also be made for the method to be continued with a further step S800 if the bit error ratio BER is not equal to the predetermined limit value GW.

By contrast, the following steps are performed if the bit error ratio BER is less than the predetermined limit value GW: A further step S760 involves determining at least one further test subsequence PSS on the basis of the determined test subsequences PSS.

For this purpose, a further step S762 involves determining the inverse INV of the test subsequence PSS as further test subsequence PSS.

Furthermore, for this purpose, a further step S764 involves forming a group G of test subsequences PSS with an identical symbol at a predetermined point of a pulse response, in particular a maximum pulse response.

Furthermore, for this purpose, a further step S766 involves determining the predetermined similarity criterion MET with regard to test subsequences PSS and evaluating it in order to select test subsequences PSS.

A further step S780 involves adding the further test subsequence PSS to the further test data set CPS.

A further step S800 involves determining the further test data set CPS with at least the determined test subsequence PSS.

A first step S900 involves applying the further test data set CPS to the channel 28.

A further step S1000 involves determining a present channel output-side data set KAD on the basis of the further test data set CPS.

A further step S1100 involves evaluating the present channel output-side data set KAD in order to determine a present error distribution FV in the channel output-side data set KAS.

A further step S1200 involves evaluating the present channel output-side data set KAD in order to determine a present bit error ratio BER in the present channel output-side data set KAD.

A further step S1300 involves comparing the bit error ratio BER with the threshold value SW.

If the comparison in step S1300 reveals that the bit error ratio BER is less than the predetermined threshold value SW, the method is continued with the further step S1400.

By contrast, if the comparison in step S1300 reveals that the bit error ratio BER is larger than the predetermined threshold value SW, in the present exemplary embodiment, the following steps S700 to S1200, including steps S740 and S760, including steps S762, S764 and S766, and also S780, are carried out, in particular repeatedly.

For this purpose, the further step S740 then involves checking whether the present bit error ratio BER determined by evaluating the channel output-side data set KAD in step S1100 is less than the predetermined limit value GW.

Deviant from the present exemplary embodiment, provision can also be made for the method to be continued with the further step S1300 if the present bit error ratio BER is equal to the predetermined limit value GW.

In the present exemplary embodiment, the method includes an initialization phase with steps S100 to S600 and a foot-controlled loop with steps S700 to S1200. Deviant from the present exemplary embodiment, the method can also include a head-controlled loop.

A further step S1400 involves evaluating the channel output-side signal KAS for error analysis if the bit error ratio BER corresponds to the predetermined threshold value SW.

Deviant from the present exemplary embodiment, the order of the steps can also be a different order. Furthermore, a plurality of steps can also be performed at the same time or simultaneously. Furthermore, deviant from the present exemplary embodiment, individual steps can also be skipped or omitted.

Consequently, in an iterative process, further test subsequences are ascertained and added to the test signal in order to optimize the test signal ever further in a stepwise manner, in the sense that the test pattern has the signal sequence which is the most complex (which loads the receiver to the greatest extent) but which is compliant, i.e., possible during real operation.

It is understood that the foregoing description is that of the exemplary embodiments of the disclosure and that various changes and modifications may be made thereto without departing from the spirit and scope of the disclosure as defined in the appended claims.

LIST OF REFERENCE NUMERALS

2 Test device
4 Arrangement
6 Device under test
8 CPS generator
10 PSS detector
12 Signal generator
14 Error detector
16 CPS eye visualizer
18 PSS classifier
20 Post-FEC determining unit
22 Single pulse
24 Pulse response
26 Eye
28 Channel
BER Bit error ratio
CPS Test data set
FV Error distribution
G Group
GW Limit value
INV Inverse
IST Initial test data set
KAD Channel output-side data set
KAS Channel output-side signal
KES Channel input-side signal
m Delay
MET Similarity criterion n Length of the signal
s1 Sequence
s2 Sequence
S(t) Signal
s+(t) Subsignal
s−(t) Subsignal
SBR Single bit response
SW Threshold value
PSS Test subsequence
S100 Step
S200 Step
S300 Step
S400 Step
S500 Step
S600 Step
S700 Step
S740 Step
S760 Step
S762 Step
S764 Step
S766 Step
S780 Step
S800 Step
S900 Step
S1000 Step
S1100 Step
S1200 Step
S1300 Step
S1400 Step

What is claimed is:

1. A method for testing a data-transferring arrangement, the method comprising:
   (a) generating an initial test data set with a predetermined minimum number of repetitions;
   (b) applying the initial test data set to the data-transferring arrangement;
   (c) acquiring a channel output-side data set based on the initial test data set;
   (d) evaluating the channel output-side data set to determine an error distribution in the channel output-side data set, wherein the error distribution indicates at what points of the channel output-side signal errors have occurred based on a comparison of the channel output-side data set with the initial test data set;
   (e) evaluating the channel output-side data set to determine a bit error ratio in the channel output-side data set;
   (f) determining at least one test subsequence by evaluating the error distribution;
   (g) forming a further test data set with at least the determined test subsequence;
   (h) applying the further test data set to the data-transferring arrangement;
   (i) acquiring a present channel output-side data set based on the further test data set;
   (j) evaluating the present channel output-side data set to determine a present error distribution in the present channel output-side data set;
   (k) evaluating the present channel output-side data set to determine a present bit error ratio in the present channel output-side data set;
   (l) comparing the present bit error ratio with a predetermined threshold value and, if the comparison reveals that the bit error ratio is larger than the predetermined threshold value, repeatedly carrying out steps (f) to (k); and
   (m) evaluating the present channel output-side data set for error analysis if the comparison reveals that the present bit error ratio is less than the predetermined threshold value.

2. The method as claimed in claim 1, further comprising: determining channel parameters of the data-transferring arrangement.

3. The method as claimed in claim 1, wherein the step (f) determining at least one test subsequence by evaluating the error distribution has at least the following steps:
   (aa) checking whether the determined bit error ratio is less than a predetermined limit value, and performing the following steps if the bit error ratio is less than the predetermined limit value:
   (bb) determining at least one further test subsequence based on the determined test subsequence; and
   (cc) adding the further test subsequence to the further test data set.

4. The method as claimed in claim 3, wherein the step (bb) determining at least one further test subsequence based on the determined test subsequence comprises the step (dd) of determining an inverse of a test subsequence as further test subsequence.

5. The method as claimed in claim 3, wherein the step (bb) determining at least one further test subsequence based on the determined test subsequence comprises the step (ee) of forming a group of test subsequences with an identical symbol at a predetermined point of a pulse response, or a maximum pulse response.

6. The method as claimed in claim 3, wherein the step (bb) determining at least one further test subsequence based on the determined test subsequence comprises the step (ff) of determining and evaluating a predetermined similarity criterion with regard to test subsequences to select test subsequences.

7. A non-transitory computer-readable medium on which a computer program is stored which, when executed by a processor, causes the processor to:
   (a) generate an initial test data set with a predetermined minimum number of repetitions;
   (b) apply the initial test data set to the data-transferring arrangement;
   (c) acquire a channel output-side data set based on the initial test data set;
   (d) evaluate the channel output-side data set to determine an error distribution in the channel output-side data set, wherein the error distribution indicates at what points of the channel output-side signal errors have occurred based on a comparison of the channel output-side data set with the initial test data set;
   (e) evaluate the channel output-side data set to determine a bit error ratio in the channel output-side data set;
   (f) determine at least one test subsequence by evaluating the error distribution;
   (g) form a further test data set with at least the determined test subsequence;
   (h) apply the further test data set to the data-transferring arrangement;
   (i) acquire a present channel output-side data set based on the further test data set;
   (j) evaluate the present channel output-side data set to determine a present error distribution in the present channel output-side data set;
   (k) evaluate the present channel output-side data set to determine a present bit error ratio in the present channel output-side data set;

(l) compare the present bit error ratio with a predetermined threshold value and, if the comparison reveals that the bit error ratio is larger than the predetermined threshold value, repeatedly carrying out steps (f) to (k); and
(m) evaluate the present channel output-side data set for error analysis if the comparison reveals that the present bit error ratio is less than the predetermined threshold value.

8. The non-transitory computer-readable medium as claimed in claim 7, wherein the initial test data set and the further test data set are stored on the non-transitory computer-readable medium.

9. A test device for testing a data-transferring arrangement, wherein the test device is configured to:
generate an initial test data set with a predetermined minimum number of repetitions and to apply the initial test data set to the data-transferring arrangement,
acquire a channel output-side data set based on the initial test data set,
evaluate the channel output-side data set to determine an error distribution in the channel output-side data set, wherein the error distribution indicates at what points of the channel output-side signal errors have occurred based on a comparison of the channel output-side data set with the initial test data set,
evaluate the channel output-side data set to determine a bit error ratio in the channel output-side data set,
determine a further test data set with at least the determined test subsequence,
apply the further test data set to the data-transferring arrangement, to determine a present channel output-side data set based on the further test data set,
evaluate the present channel output-side data set to determine a present error distribution in the channel output-side data set,
evaluate the present channel output-side data set to determine a present bit error ratio in the present channel output-side data set, to compare the present bit error ratio with a predetermined threshold value, and if the comparison reveals that the bit error ratio is larger than the predetermined threshold value, to carry out, in particular repeatedly carry out, at least one process of determining at least one further test subsequence by evaluating the further error distribution, and
evaluate the channel output-side data set for error analysis if the comparison reveals that the present bit error ratio is less than the predetermined threshold value.

10. The test device as claimed in claim 9, wherein the test device is further configured to determine channel parameters of the data-transferring arrangement.

11. The test device as claimed in claim 9, wherein the test device is further configured to check whether the bit error ratio determined by evaluating the channel output-side data set is less than a predetermined limit value and, if the bit error ratio is less than the limit value, to determine at least one further test subsequence based on the determined test subsequence and to add the further test subsequence to the further test data set.

12. The test device as claimed in claim 11, wherein the test device is further configured to determine an inverse of a test subsequence as further test subsequence.

13. The test device as claimed in claim 11, wherein the test device is further configured to form a group of test subsequences with an identical symbol at a predetermined point of a pulse response, or a maximum pulse response.

14. The test device as claimed in claim 11, wherein the test device is further configured to determine and evaluate a predetermined similarity criterion with regard to test subsequences to select test subsequences.

* * * * *

UNITED STATES PATENT AND TRADEMARK OFFICE
CERTIFICATE OF CORRECTION

PATENT NO. : 12,222,831 B2
APPLICATION NO. : 18/112289
DATED : February 11, 2025
INVENTOR(S) : Anton Unakafov et al.

It is certified that error appears in the above-identified patent and that said Letters Patent is hereby corrected as shown below:

In the Specification

For <u>DESCRIPTION OF EXEMPLARY EMBODIMENTS,</u>

Column 4, Line 53: Replace "(>10-6)" with "$< 10^{-6}$"

Column 5, Line 63-64: Replace "channel 18" with "channel 28"

Column 6, Line 20: Replace "function" with "signal"

Column 6, Line 37: Replace "$(2*10^{12} / 20*10^9) = 100$" with "$((2*10^{12}) / (20*10^9)) = 100$"

Column 6, Lines 45-46: Replace "test subsequence PSS (problematic subsequence)" with "test subsequence PSS (PSS problematic subsequence)"

Column 7, Line 3: Replace "test" with "problematic"

Column 7, Line 9: Replace "test" with "problematic"

Column 7, Lines 32-33: Replace "test device 2 is configured to determine at least one test subsequence PSS" with "test device 2 is configured to determine at least one problematic subsequence PSS"

Column 7, Line 35: Replace "test" with "problematic"

Column 7, Line 52: Replace "test" with "problematic"

Column 7, Line 57: Replace "test" with "problematic"

Column 7, Line 59: Replace "test" with "problematic"

Signed and Sealed this
Fourteenth Day of October, 2025

John A. Squires
*Director of the United States Patent and Trademark Office*

CERTIFICATE OF CORRECTION (continued)
U.S. Pat. No. 12,222,831 B2

Column 8, Line 9: Replace "test" with "problematic"

Column 8, Line 23: Replace "test" with "problematic"

Column 8, Line 24: Replace "test" with "problematic"

Column 8, Line 25: Replace "test" with "problematic"

Column 8, Line 28: Replace "test" with "problematic"

Column 8, Lines 29-30: Replace "test subsequence PSS and/or to form a group of test subsequences PSS" with "problematic subsequence PSS and/or to form a group of problematic subsequences PSS"

Column 8, Line 33: Replace "test" with "problematic"

Column 9, Line 54: Replace "test" with "problematic"

Column 9, Line 56: Replace "test" with "problematic"

Column 9, Line 57: Replace "test" with "problematic"

Column 9, Line 59: Replace "test" with "problematic"

Column 9, Line 63: Replace "test" with "problematic"

Column 9, Line 64: Replace "test" with "problematic"

Column 9, Line 66: Replace "test" with "problematic"

Column 10, Line 4: Replace "test" with "problematic"

Column 10, Line 8: Replace "test" with "problematic"

Column 10, Line 10: Replace "test" with "problematic"

Column 10, Lines 14-15: Replace "of the test subsequence PSS as present further test subsequence PSS" with "of the problematic subsequence PSS as present further problematic subsequence PSS"

Column 10, Line 23: Replace "s (t)" with "s-(t)"

Column 10, Lines 28-29: Replace "test device 2 is configured to form a group of test subsequences PSS" with "test device 2 is configured to form a group of problematic subsequences PSS"

Column 10, Line 36: Replace "test" with "problematic"
Column 10, Line 37: Replace "test" with "problematic"

CERTIFICATE OF CORRECTION (continued)
U.S. Pat. No. 12,222,831 B2

Column 10, Line 50: Replace "SBR (0)=0.3" with "SBR (3)=0.3"

Column 11, Line 15: Replace "test" with "problematic"

Column 11, Line 30: Replace "test" with "problematic"

Column 11, Line 31: Replace "test" with "problematic"

Column 11, Lines 33-34: Replace "the inverse INV of the test subsequence PSS as further test subsequence PSS." with "the inverse INV of the problematic subsequence PSS as further problematic subsequence PSS."

Column 11, Line 36: Replace "test" with "problematic"

Column 11, Line 41: Replace "test" with "problematic"

Column 11, Line 42: Replace "test" with "problematic"

Column 11, Line 43: Replace "test" with "problematic"

Column 11, Line 46: Replace "test" with "problematic"

For <u>LIST OF REFERENCE NUMERALS,</u>

Column 13, Line 9: Replace "test" with "problematic"